（12）United States Patent
Cragun

(10) Patent No.: US 6,385,627 B1
(45) Date of Patent: *May 7, 2002

(54) METHOD, APPARATUS AND COMPUTER PROGRAM PRODUCT FOR PROVIDING DOCUMENT USER ROLE INDICATION

(75) Inventor: Brian John Cragun, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,631

(22) Filed: Nov. 24, 1997

(51) Int. Cl.[7] .......................... G06F 17/00; G06F 15/16
(52) U.S. Cl. ....................... 707/500; 709/201; 709/246; 345/347
(58) Field of Search ................................ 345/335, 347; 379/265; 455/4.2; 707/515, 500; 709/201, 246, 225

(56) References Cited

U.S. PATENT DOCUMENTS

| 5,337,360 | A | | 8/1994 | Fischer |
| 5,465,299 | A | | 11/1995 | Matsumoto et al. |
| 5,754,939 | A | * | 5/1998 | Herz et al. ................... 455/4.2 |
| 5,802,314 | A | * | 9/1998 | Tullis et al. ................ 709/246 |
| 5,818,447 | A | * | 10/1998 | Wolf et al. ................. 345/335 |
| 5,892,909 | A | * | 4/1999 | Grasso et al. ............... 709/201 |
| 5,953,406 | A | * | 9/1999 | LaRue et al. ................ 379/265 |
| 6,057,841 | A | * | 5/2000 | Thurlow et al. ............. 345/347 |
| 6,073,142 | A | * | 6/2000 | Geiger et al. ............... 707/500 |
| 6,161,139 | A | * | 12/2000 | Win et al. ................... 709/225 |
| 6,301,621 | B1 | * | 10/2001 | Haverstock et al. ........ 709/246 |

OTHER PUBLICATIONS

Graphic E–mail Version 1.1c [screenshots from software appication and help files], Graphic E Software—Vimar Software, Inc., pp. 1–34, 1996.*
Using Netscape 2—2nd Ed. Mark R. Brown, Que Corporation pp. 353–375, 643–644, 862–865, 1995.*
WordPerfect 6.1 For Windows For Dummies—2nd Ed., M. Levine, IDG Books, pp. 153–156, 271–278. 1994.*

* cited by examiner

Primary Examiner—Joseph H. Feild
Assistant Examiner—William L. Bashore
(74) Attorney, Agent, or Firm—Joan Pennington; Owen J. Gamon

(57) ABSTRACT

An intelligent method, apparatus and computer program product are provided for providing a digital document user role indication. A user role profile for a user is stored. Selecting rules are utilized for identifying one of the plurality of roles from the stored user role profile. Responsive to the applying the selecting rules, a selected user role indication is appended to a digital document. The user role indication can be selected based upon document content, a time of day value, and/or send lists for the digital document. Multiple user selected settings can be selected for the role from a group of enviromental values including name, icon, selection sound, header, footer, opening, closing, background, encryption, signature key, and priority.

19 Claims, 9 Drawing Sheets

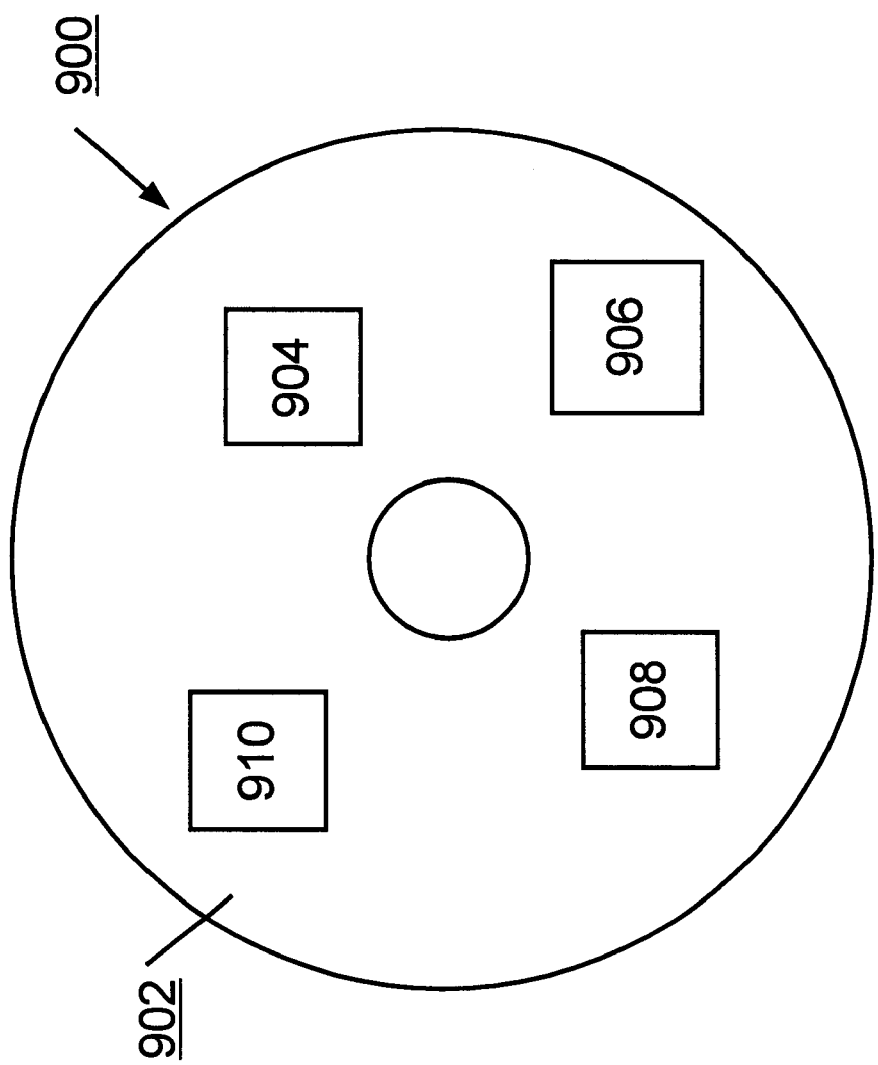

METHOD, APPARATUS AND COMPUTER PROGRAM PRODUCT FOR PROVIDING DOCUMENT USER ROLE INDICATION

FIELD OF THE INVENTION

The present invention relates to the data processing field, and more particularly, relates to a method, apparatus and computer program product implemented in a computer system for providing a digital document user role indication.

DESCRIPTION OF THE RELATED ART

In today's computer systems, some known applications or computer software products include an electronic signature. People often have multiple different roles. For example, individuals having businesses at their homes need to respond to business and personal communications. When a person writes letters, they close their letters and sign their name different ways. Known electronic mail (E-mail) software automatically appends a digital signature without requiring an individual computer user to provide user information. However, it is cumbersome and time consuming to change the signature utilizing known software.

A need exists for a mechanism for providing different signatures for electronic or digital documents, while maintaining the productivity of automatically appending the signature. It is desirable to provide a method and computer program product for providing a digital document user role indication that efficiently and effectively facilitates automated generation of an appropriate digital document user role indication.

SUMMARY OF THE INVENTION

A principal object of the present invention is to provide an intelligent method, apparatus and computer program product for providing a digital document user role indication. Other important objects of the present invention are to provide such methods, apparatus and computer program product for providing a digital document user role indication that efficiently and effectively facilitates automated generation of an appropriate digital document user role indication; to provide such method, apparatus and computer program product substantially without negative effect; and that overcome many of the disadvantages of prior art arrangements.

In brief, an intelligent method, apparatus and computer program product are provided for providing a digital document user role indication. A user role profile for a user is stored. Selecting rules are utilized for identifying one of the plurality of roles from the stored user role profile. Responsive to the applying the selecting rules, a selected user role indication is appended to a digital document.

In accordance with features of the invention, the user role indication can be selected based upon document content, a time of day value, and/or send lists for the digital document. Multiple user selected settings can be selected for the role from a group of enviromental values including name, icon, selection sound, header, footer, opening, closing, background, encryption, signature key, and priority.

BRIEF DESCRIPTION OF THE DRAWINGS

The present invention together with the above and other objects and advantages may best be understood from the following detailed description of the preferred embodiments of the invention illustrated in the drawings, wherein:

FIG. 9 is a block diagram illustrating a computer program product in accordance with the preferred embodiment.

DETAILED DESCRIPTION OF THE PREFERRED EMBODIMENTS

Figure 1:
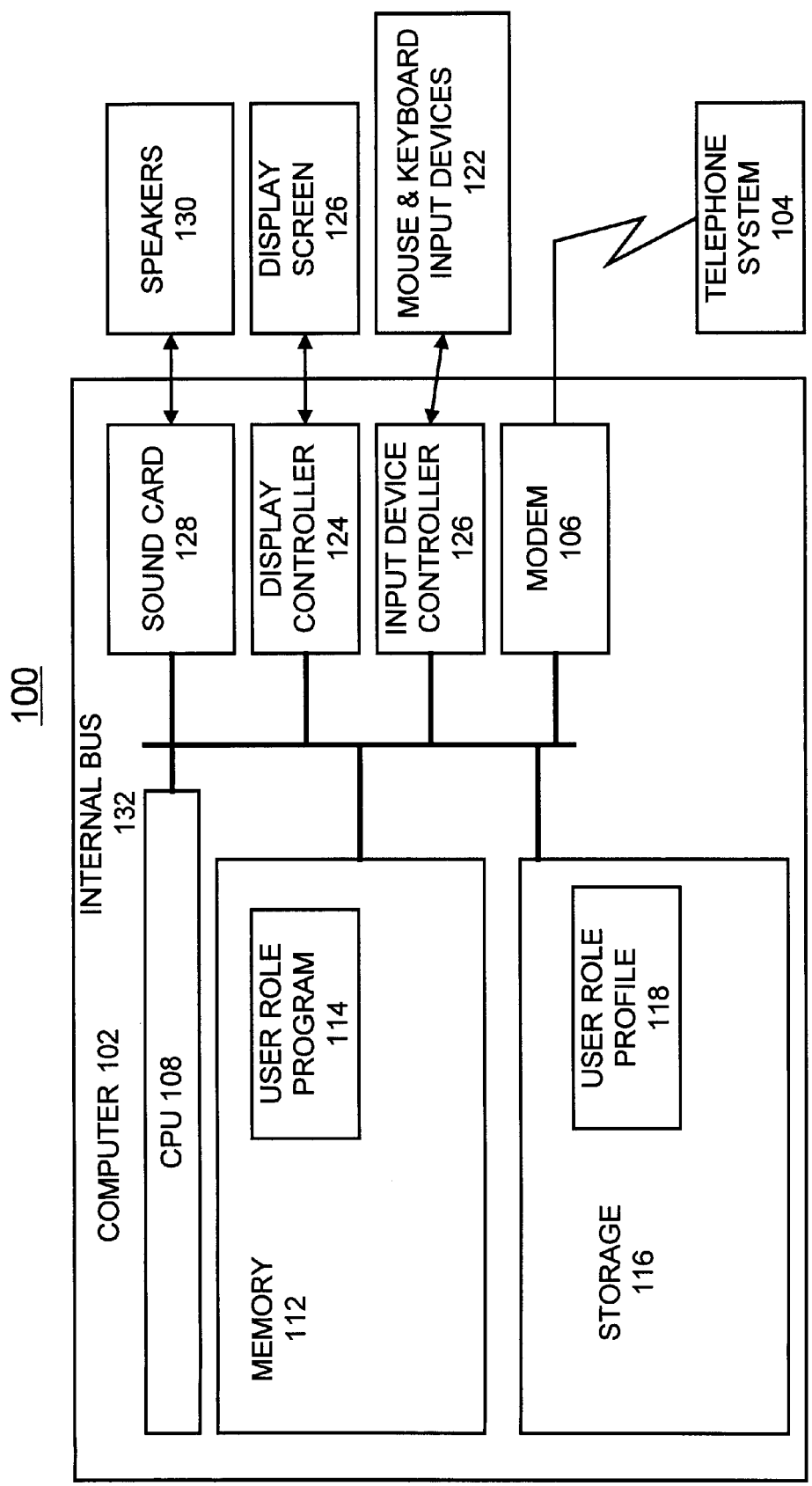
FIG. 1 is a block diagram representation illustrating a computer system for implementing a method apparatus, and computer program product for providing a digital document user role indication in accordance with the preferred embodiment.

Having reference now to the drawings, in FIG. 1 there is shown is a block diagram representation illustrating a computer system generally designated by 100 for performing a method and computer program product for providing a digital document user role indication in accordance with the preferred embodiment. Computer system 100 includes a computer 102 optionally connected to a telephone system 104 via an internal modem 106, as shown. Computer 102 includes a central processing unit (CPU) 108 and a first memory and a second storage respectively designated by 112 and 116. As illustrated, memory 112 stores program and data information including a digital document user role indication program 114 for providing a digital document user role indication of the preferred embodiment. Storage 116 stores a user role profile 118 of the preferred embodiment. The user role profile 118 is illustrated and described with respect to FIG. 6. Computer 102 includes an input device controller 120 operatively coupled to a mouse and keyboard input devices 122, a display controller 124 operatively coupled to a display screen 126 and a sound card 128 operatively coupled to speakers 130. An internal bus 132 facilitates communications among the components of computer 102.

Various commercially available computers can be used for computer 102 in the computer system 100, for example, an IBM personal computer. CPU 108 is suitably programmed by the digital document user role indication program 114 to generate display screens, for example as shown in FIGS. 2 and 3; to maintain the internal data structure or user role profile 118 as shown in FIG. 6 and to execute the flowcharts of FIGS. 4, 5, 7 and 8.

In accordance with features of the invention, a digital document user role indication is selected from a set of roles and automatically appended to a digital document, such as an electronic mail document. The user role indication is selected based on the destination, the recipient, and/or the content of the digital document. Selection rules are either explicitly defined by the user or observed by the system and submitted for user approval. A user can use different mood signatures for the same role. The user can override an automatic selection and selecting from a list of signatures.

Figure 2:
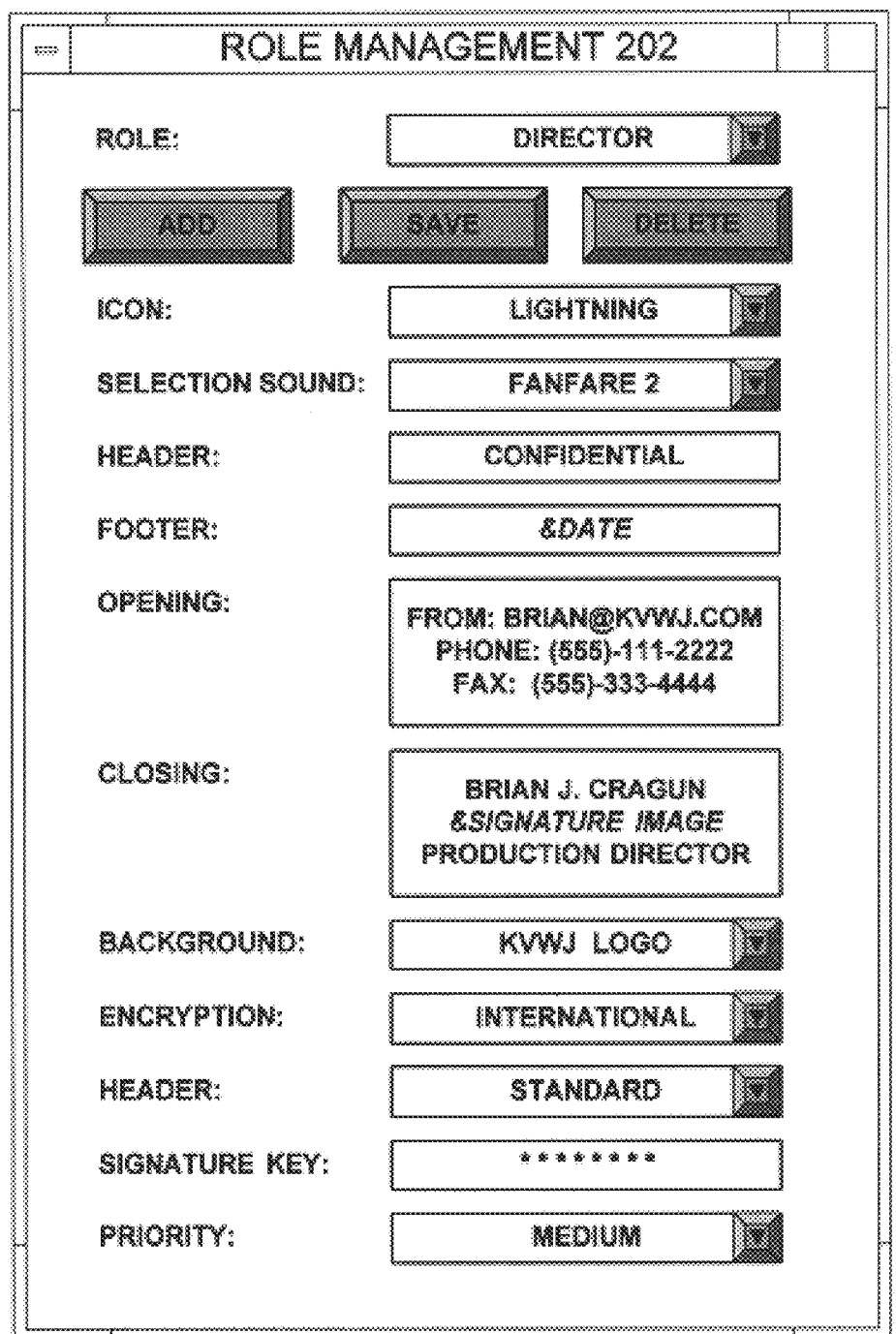
FIG. 2 is an exemplary display screen of the system of FIG. 1 illustrating a user role management interface for providing a digital document user role indication in accordance with the preferred embodiment.

Referring to FIG. 2, there is shown an exemplary display screen 200 illustrating a user role management interface 202 for providing a digital document user role indication in accordance with the preferred embodiment. The user can add, save and delete roles using the user role management interface 202. The user can enter an opening and closing or user role indication for each role using the user role management interface 202. Also the user can enter a name, icon, selection sound, header, footer, background, encryption, signature key, and priority for each role.

Figure 3:
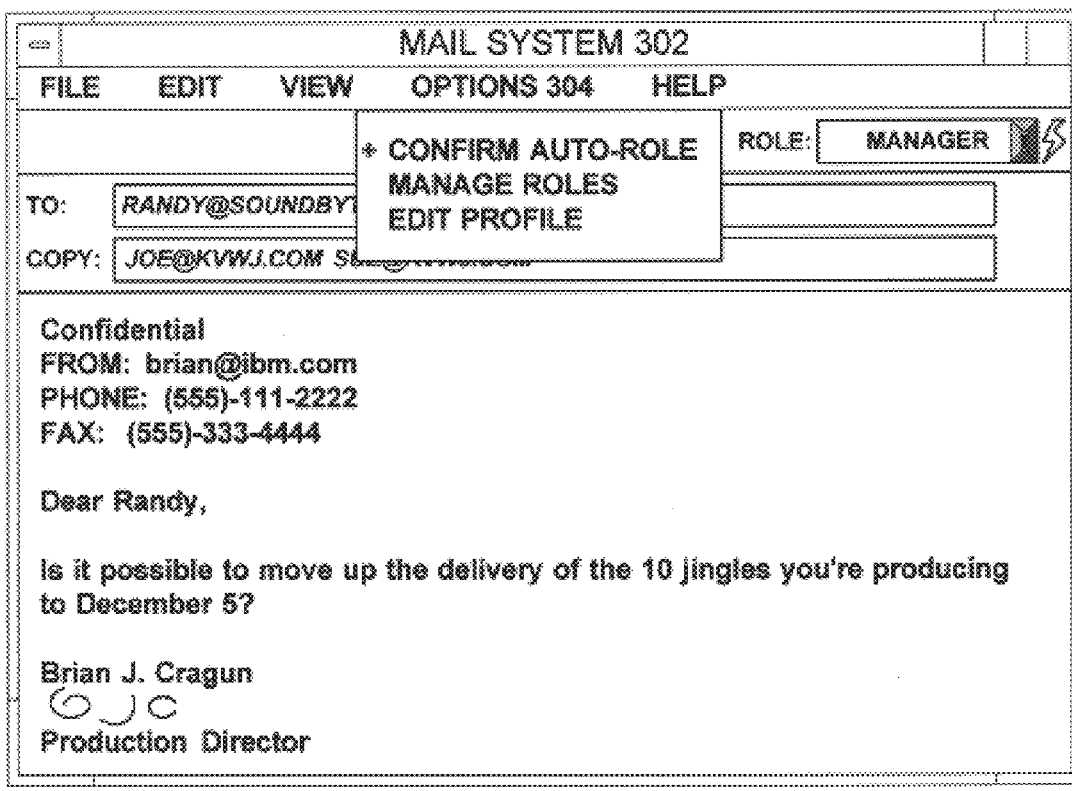
FIG. 3 is an exemplary display screen of the system of FIG. 1 illustrating a user mail system interface for providing a digital document user role indication in accordance with the preferred embodiment.

Referring to FIG. 3, an exemplary display screen 300 illustrating a user mail system interface 302 for providing a digital document user role indication in accordance with the preferred embodiment. Under an options field 304, the user can select to confirm the automatic role indication, manage roles and edit the user role profile 118. By setting the confirm auto-role option, the automatically selected user role indication for a digital document is displayed and the user is allowed to confirm the selected user role indication, as illustrated and described with respect to FIG. 5. In FIG. 5, an icon representing the role is shown as a role manager selector.

Figure 4:
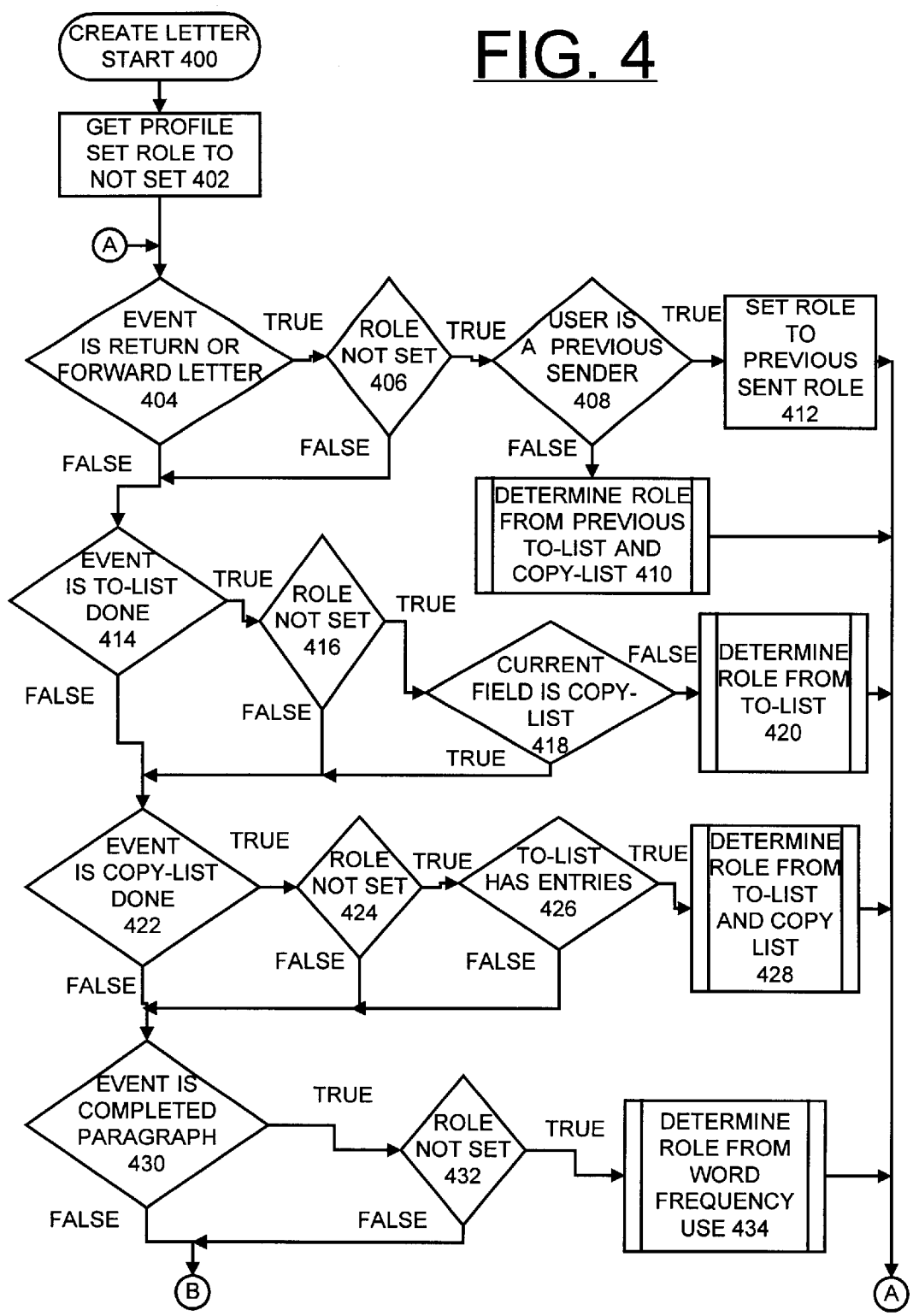
FIGS. 4 and 5 together provide a flow chart illustrating sequential operations in accordance with the method and computer program product for providing a digital document user role indication of the preferred embodiment.
Figure 5:
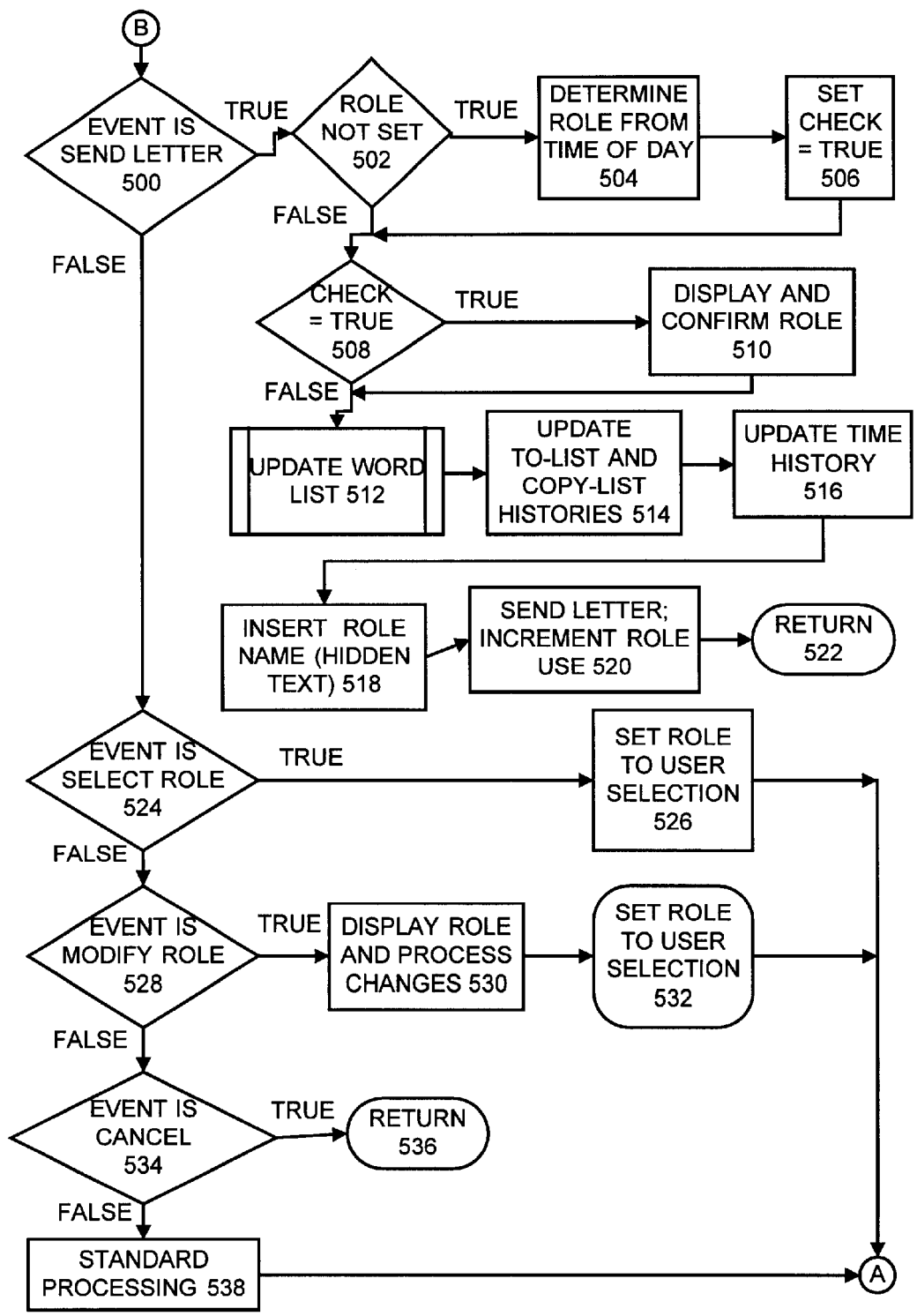
Figure 6:
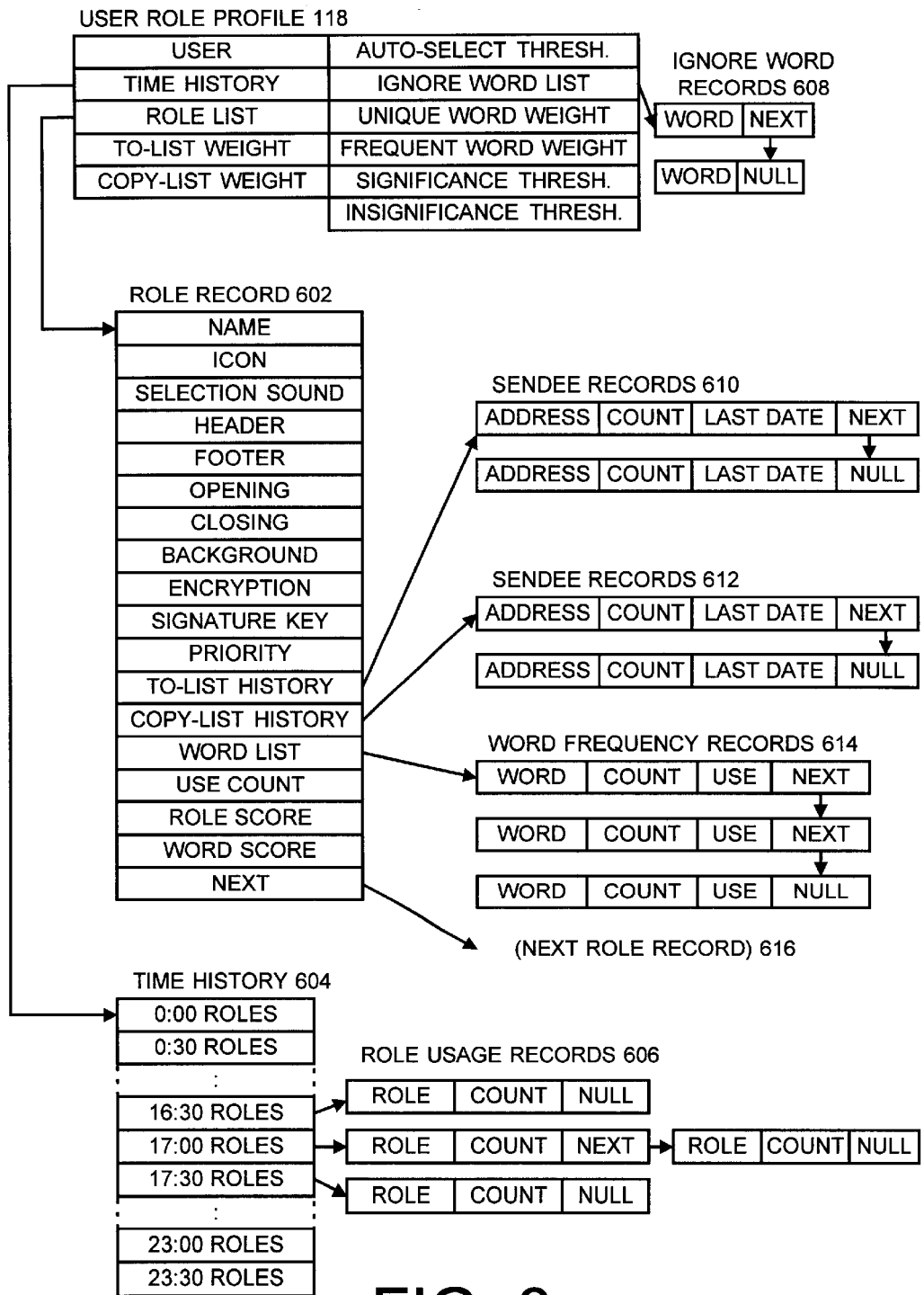
FIG. 6 is a chart illustrating an exemplary internal data structure of a user role profile for providing a digital document user role indication of the preferred embodiment.

Referring now to FIGS. 4 and 5 together provide a flow chart illustrating exemplary user role indication startup and processing operations in accordance with a method and digital document user role indication program 114 for providing a digital document user role indication of the preferred embodiment. The sequential operations starting at block 400 begin with creating a letter. A user role profile 118 is obtained and the role is set to not set as indicated at a block 402. Checking whether the event is return or forward letter is performed as indicated at a decision block 404. When the event is return or forward letter, then checking whether the role is not set is performed as indicated at a decision block 406. If the role is not set, then checking whether the user is a previous sender is performed as indicated at a decision block 408. If the user is not a previous sender, then a routine is performed to determine role from the previous to-list and copy-list as indicated at a block 410. Send list includes the to-list and copy-list of user mail recipients as illustrated in the fields TO: and COPY: in the user mail system interface 302 FIG. 3. If the user is a previous sender, then the role is set to the previous sent role as indicated at a block 412 and the sequential operations return following entry point A with block 404.

When determined that the event is not return or forward letter at decision block 404 or that role not set is false at decision block 406, then checking whether the event is to-list done as indicated at a decision block 414. If the event is to-list done, then checking whether the role is not set is performed as indicated at a decision block 416. If the role is not set, then checking whether the current field is copy-list is performed as indicated at a decision block 418. If the current field is not copy-list, then a routine is performed to determine the role from to-list as indicated at a block 420 and the sequential operations return following entry point A with block 404.

When determined that the event is not to-list done at decision block 414, or that role not set is false at decision block 416, or that the current field is not copy-list at decision block 418, then checking whether the event is copy-list done is performed as indicated at a decision block 422. If the event is copy-list done, then checking whether the role is not set is performed as indicated at a decision block 424. If the role is not set, then checking whether the to-list has entries is performed as indicated at a decision block 426. If the to-list has entries, then a routine is performed to determine the role from to-list and copy-list as indicated at a block 428 and the sequential operations return following entry point A with block 404.

When determined that the event is not copy-list done at decision block 422, or that role not set is false at decision block 424, or that to-list has entries is false at decision block 426, then checking whether the event is completed paragraph is performed as indicated at a decision block 430. If the event is completed paragraph, then checking whether the role is not set is performed as indicated at a decision block 432. If the role is not set, then a routine is performed to determine the role from word frequency use as indicated at a block 434 and the sequential operations return following entry point A with block 404.

Referring to FIG. 5, following entry point B, when determined that the event is not completed paragraph at decision block 430, or that role not set is false at decision block 432, then checking whether the event is send letter is performed as indicated at a decision block 500. If the event is sent letter, then checking whether the role is not set is performed as indicated at a decision block 502. If the role is not set, then the role is determined from the time of day as indicated at a block 504. Then a check is set equal to true as indicated at a block 506. Check is the flag set by confirm auto-role under options 304 in FIG. 3. At block 506, the check is set to require the confirmation to be done. Then or if the role is set at decision block 502, checking whether the check equals true is performed as indicated at a decision block 508. If check equals true, then the role is displayed and confirmed as indicated at a block 510. Then and when check is not true, a routine is performed to update the word list by processing the contents of the letter as indicated at a block 512. Then the to-list and copy-list histories are updated as indicated at a block 514. The time history is updated as indicated at a block 516. A user role indication or role name is in ed, for example as hidden text as indicated at a block 518. Then the letter is sent and the role use in the user role profile 118 is incremented as indicated at a block 520. Then the operations return as indicated at a block 522.

When the event is not send letter at decision block 500, then checking whether the event is select role is performed as indicated at a decision block 524. If the event is select role, then the role is set to the user selection as indicated at a block 526 and the sequential operations return following entry point A with block 404 in FIG. 4. If the event is not select role, then checking whether the event is modify role is performed as indicated at a decision block 528. If the event is modify role, the role is displayed and the changes are processed as indicated at a block 530. Then the role is set to the user selection as indicated at a block 532 and the sequential operations return following entry point A with block 404 in FIG. 4. If the event is not modify role, then checking whether event is cancel is performed as indicated at a decision block 534. If the event is cancel, then the operations return as indicated at a block 536. If the event is not cancel, then standard processing is performed as indicated at a block 538.

Referring to FIG. 6, there is shown an exemplary internal data structure of the user role profile 118 for providing a digital document user role indication of the preferred embodiment. The user role profile 118 stores multiple values identifying a user, a time history, a role list, a to-list weight, a copy-list weight, an auto-select threshold, an ignore word list, a unique word weight, a frequent word weight, a significance threshold, and an insignificance threshold. The role list includes a role record 602. The role record 602 includes user selected values including a name, icon, selection sound, header, footer, opening, closing, background, encryption, signature key, and priority, for example as illustrated in FIG. 2. The role record 602 includes multiple values generated by user role program 114 including to-list history, copy-list history, word list, use count, role score, word score and next. The time history includes a time history 604 for multiple roles and role usage records 606. The role usage record 606 include multiple fields including role, count, and null or next pointing to a next record. The ignore word list can include multiple ignore word records 608 including a word and a next or null fields. The to-list history includes sendee records 610 including multiple fields of address, count, last date and next or null. The copy-list history includes sendee records 612 similarly including multiple fields of address, count, last date and next or null. The word list of role record 602 includes multiple word frequency records 614. The word frequency records 614 include multiple fields of word, count, use, and next or null. The next field of role record 602 points to a next role record 616.

Figure 7:
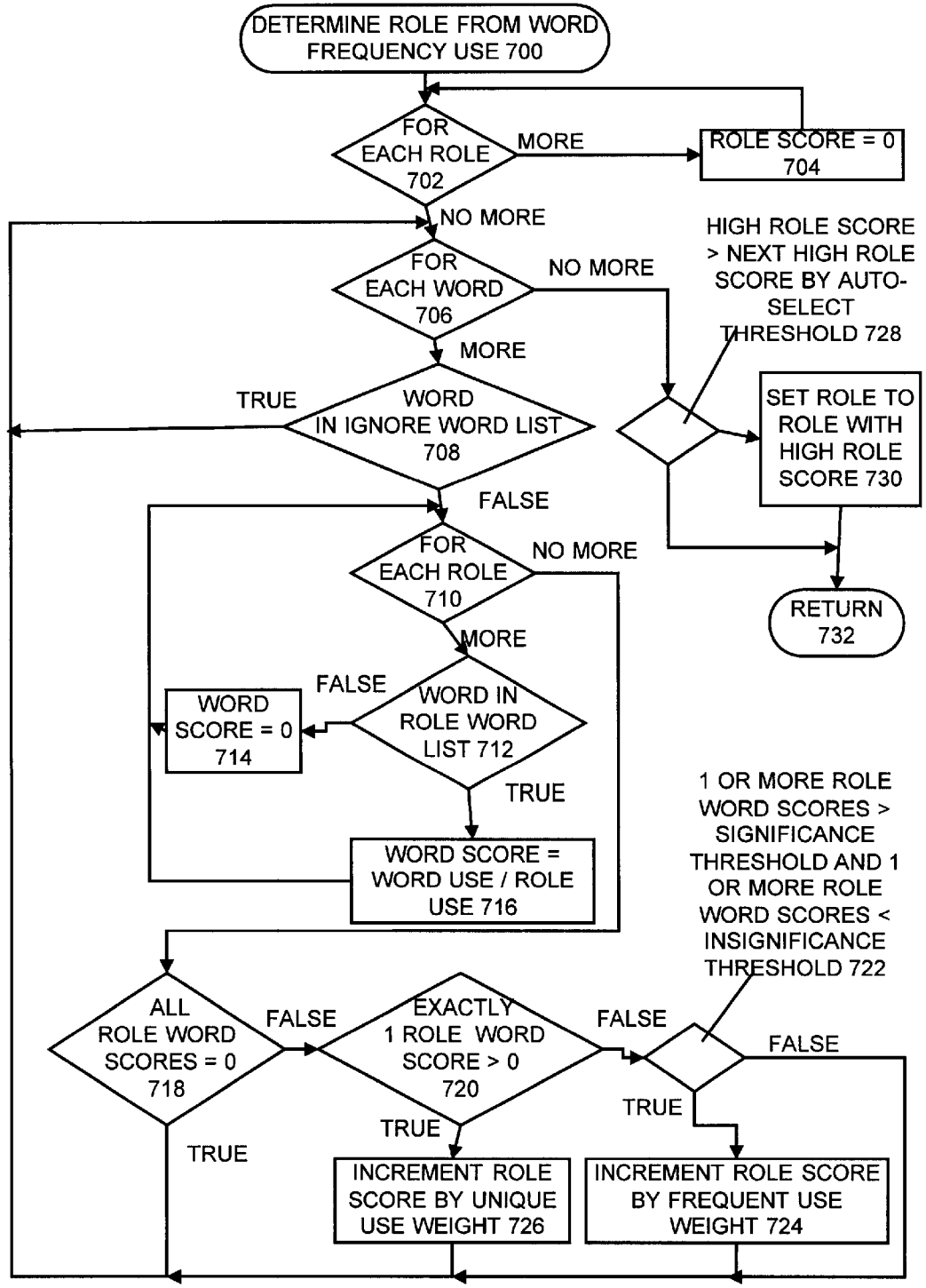
FIG. 7 is a flow chart illustrating sequential operations in accordance with the method and computer program product for providing a digital document user role indication of the preferred embodiment.

Referring to FIG. 7, there is shown a flow chart illustrating sequential operations in accordance with the method and computer program product for providing a digital document user role indication of the preferred embodiment utilizing word frequency use. The sequential steps to determine a role from word frequency use begin as indicated at a block 700. For each role identified at a decision block 702, first the role score is set to zero as indicated at a block 704. Then for each word identified at a decision block 706, checking whether the word is in the ignore word list is performed as indicated at a decision block 708. If true, then a next word is identified returning to decision block 706. If the word is not in the ignore word list, then for each role identified at a decision block 710, checking for the word in the role word list is performed as indicated at a decision block 712. If the word is not in the role word list, then the word score for that role is set to zero as indicated at a block 714. If the word is in the role word list, then the word score for the role is calculated equal to the word use divided by the role use as indicated at a block 716.

When no more roles are identified at block 710, then checking whether all role word scores equal zero is performed as indicated at a decision block 718. If all word scores equal zero, then the operations returns to block 706 to process a next word. If all word scores are not equal zero, then checking whether exactly one role word score is greater than zero is performed as indicated at a decision block 720. If false, then checking whether one or more role word scores is greater than a significance threshold and one or more role word scores is less than an insignificance threshold is performed as indicated at a decision block 722. If false, then the operations returns to block 706 to process a next word. If true, then the role score is incremented by a frequent use weight as indicated at a block 724. When exactly one role word score is greater than zero, then the role score is incremented by a unique use weight as indicated at a block 726. Then the operations returns to block 706 to process a next word.

When no more words are identified at block 706, then checking whether a high role score is greater than a next high role by an auto-select threshold is performed as indicated at a decision block 728. If true, then the role is set to the role with the high role score as indicated at a block 730. Otherwise the operations return as indicated at a block 732.

Figure 8:
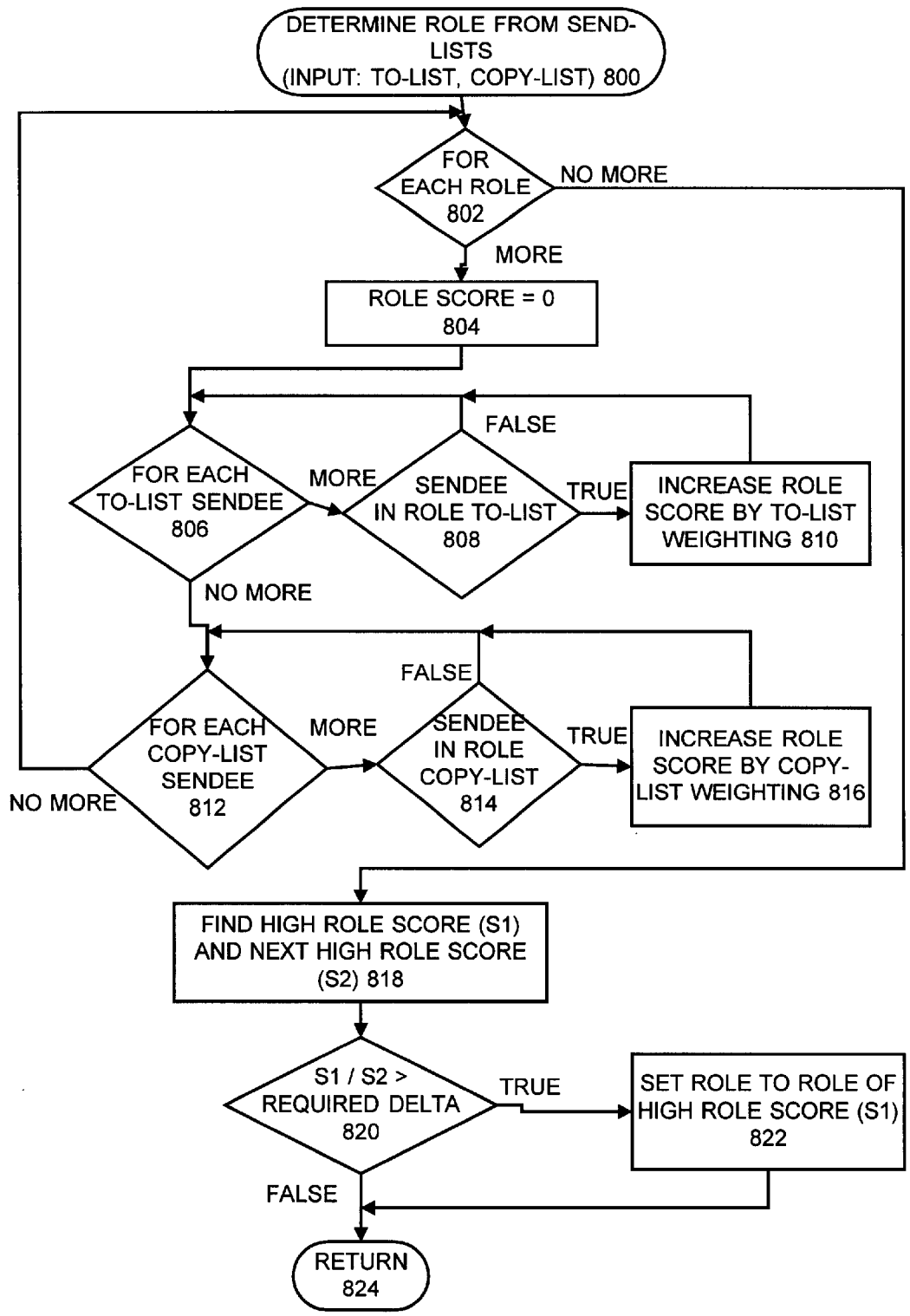
FIG. 8 is a flow chart illustrating additional sequential operations in accordance with the method and computer program product for providing a digital document user role indication of the preferred embodiment.

Referring to FIG. 8, there is shown a flow chart illustrating sequential operations in accordance with the method and computer program product for providing a digital document user role indication of the preferred embodiment utilizing send lists. The sequential operations to determine the role from the send lists, to-list and copy-list, begin as indicated at a block 800. For each role identified at a decision block 802, a role score is set to zero as indicated at a block 804. Then for each to-list sendee identified at a decision block 806, checking for the sendee in role to-list is performed as indicated at a decision block 808. When the sendee is in the role to-list, then the role score is increased by the to-list weighting as indicated at a block 810. Then for each copy-list sendee identified at a decision block 812, checking for the sendee in role copy-list is performed as indicated at a decision block 814. When the sendee is in the role copy-list, then the role score is increased by copy-list weighting as indicated at a block 816. Next a high role score (S1) and a next high role score (S2) are found as indicated at a block 818. The ratio of S1 and S2 is compared to a required delta as indicated at a decision block 820. If true, the role is set to the role of the high role score (S1) as indicated at a block 822. Then the sequential operations return as indicated at a block 824.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 902 stores program means 904, 906, 908, 910 on the medium 902 for carrying out the methods of this invention in the system 100 of FIG. 1.

A sequence of program instructions or a logical assembly of one or more interrelated modules defined by the recorded program means 904, 906, 908, 910, direct the computer for providing a digital document user role indication in accordance with the method of the preferred embodiment.

While the present invention has been described with reference to the details of the embodiments of the invention shown in the drawing, these details are not intended to limit the scope of the invention as claimed in the appended claims.

What is claimed is:

1. A computer program product for providing a digital document user role indication comprising:
   a recording medium;
   means, recorded on the recording medium, for storing a user role profile; said user role profile including a set of roles; said user role profile storing a role list including a role record including a word list, a use count, a role score, and a word score; said means, recorded on the recording medium, for storing said user role profile including means, recorded on the recording medium, for receiving a user selection for modifying a role;
   means, recorded on the recording medium, for applying selecting rules for identifying a role from said set of roles from said user role profile; and
   means, recorded on the recording medium, responsive to said applied selecting rules for appending the selected user role indication to a digital document.

2. A computer program product for providing a digital document user role indication as recited in claim 1 wherein said means, recorded on the recording medium, for storing said user role profile includes means, recorded on the recording medium, for receiving a user selection for setting a user selected role.

3. A computer program product for providing a digital document user role indication as recited in claim 1 further include means, recorded on the recording medium, for selecting multiple settings for said role from a group of environmental values including name, icon, selection sound, header, footer, opening, closing, background, encryption, signature key, and priority.

4. A computer program product for providing a digital document user role indication as recited in claim 1 wherein said means, recorded on the recording medium, for applying selecting rules for identifying said role from said set of roles from said user role profile include means, recorded on the recording medium, for determining said role from word frequency use.

5. A computer program product for providing a digital document user role indication as recited in claim 1 wherein said means, recorded on the recording medium, for applying selecting rules for identifying said role from said set of roles from said user role profile include means, recorded on the recording medium, for identifying a predefined user selection and for confirming said selected user role indication.

6. A computer program product for providing a digital document user role indication as recited in claim 1 wherein said means, recorded on the recording medium, for applying selecting rules for identifying said role from said set of roles from said user role profile include means, recorded on the recording medium, for determining said role from a send-list including a send to list and a copy list.

7. A computer program product for providing a digital document user role indication as recited in claim 6 wherein said means, recorded on the recording medium, for determining said role from said send to list and said copy list include means, recorded on the recording medium, for comparing each send to list sendee and each copy list sendee with stored values in said user role profile.

8. A computer program product for providing a digital document user role indication as recited in claim 1 wherein said means, recorded on the recording medium, for applying selecting rules for identifying said role from said set of roles from said user role profile include means, recorded on the recording medium, for determining said role from a time of day value.

9. A computer-implemented method for providing a digital document user role indication in a computer system, said method comprising the steps of:
  storing a user role profile; said user role profile including a set of roles; said user role profile storing a role list including a role record including a word list, a use count, a role score, and a word score;
  receiving a user selection for modifying a role;
  applying predefined selecting rules to automatically select a role from said set of roles from said user role profile; and
  appending the selected user role indication to a digital document.

10. A computer-implemented method for providing a digital document user role indication as recited in claim 9 wherein said step of storing said user role profile includes the steps of storing user selected entries.

11. A computer-implemented method for providing a digital document user role indication as recited in claim 9 wherein said step of storing said user role profile includes the steps of identifying predetermined historical values from digital documents and storing said identified predetermined historical values in said user role profile.

12. A computer-implemented method for providing a digital document user role indication as recited in claim 9 wherein said step of applying predefined selecting rules to automatically select said role from said set of roles from said user role profile includes the steps of identifying a predefined user selection and confirming said selected user role indication.

13. A computer-implemented method for providing a digital document user role indication as recited in claim 9 wherein said step of applying predefined selecting rules to automatically select said role from said set of roles from said user role profile includes the steps of determining said role from word frequency use in the digital document.

14. A computer-implemented method for providing a digital document user role indication as recited in claim 9 wherein said step of applying predefined selecting rules to automatically select said role from said set of roles from said user role profile includes the steps of determining said role utilizing a time of day value.

15. A computer-implemented method for providing a digital document user role indication as recited in claim 9 wherein said step of applying predefined selecting rules to automatically select said role from said set of roles from said user role profile includes the steps of determining said role utilizing send-lists including a send to list and a copy list from the digital document.

16. A computer-implemented method for providing a digital document user role indication as recited in claim 9 further includes the steps of receiving multiple user selected settings for said role selected from a group of environmental values including name, icon, selection sound, header, footer, opening, closing, background, encryption, signature key, and priority; and displaying selected ones of said multiple user selected settings for said role with the digital document.

17. Apparatus for providing a digital document user role indication in a computer system comprising:
  means for storing a user role profile; said user role profile including a set of roles; said user role profile storing a role list including a role record including a word list, a use count, a role score, and a word score; said means for storing said user role profile including means for receiving a user selection for modifying a role;
  means for applying selecting rules to identify a role from said set of roles from said user role profile; and
  means responsive to said applied selecting rules for appending the selected user role indication to a digital document.

18. Apparatus for providing a digital document user role indication as recited in claim 17 wherein said means for storing said user role profile include means for receiving a user selections for adding and modifying role values and means for identifying predetermined values from the digital document and for storing said identified predetermined values in said user role profile.

19. Apparatus for providing a digital document user role indication as recited in claim 17 wherein said means for applying selecting rules to identify said role from a set of roles include means for identifying word frequency values and send lists from the digital document and determining said role utilizing said identified values.

* * * * *